(12) United States Patent
Tenorio

(10) Patent No.: US 7,050,874 B1
(45) Date of Patent: May 23, 2006

(54) SOURCING OF BILLS OF MATERIALS

(75) Inventor: Manoel Tenorio, Mountain View, CA (US)

(73) Assignee: i2 Technologies US, Inc., Dallas, TX (US)

( * ) Notice: Subject to any disclaimer, the term of this patent is extended or adjusted under 35 U.S.C. 154(b) by 624 days.

(21) Appl. No.: 09/976,791

(22) Filed: Oct. 12, 2001

(51) Int. Cl.
*G06F 17/00* (2006.01)

(52) U.S. Cl. .......................... 700/107; 716/1

(58) Field of Classification Search ............... 700/107; 716/1
See application file for complete search history.

(56) References Cited

U.S. PATENT DOCUMENTS

| | | | | |
|---|---|---|---|---|
| 5,204,821 A | * | 4/1993 | Inui et al. | 700/106 |
| 5,515,269 A | | 5/1996 | Willis et al. | 364/401 |
| 5,630,070 A | * | 5/1997 | Dietrich et al. | 705/8 |
| 5,835,910 A | * | 11/1998 | Kavanagh et al. | 707/103 R |
| 5,970,476 A | * | 10/1999 | Fahey | 705/28 |
| 6,119,102 A | * | 9/2000 | Rush et al. | 705/29 |
| 6,199,068 B1 | * | 3/2001 | Carpenter | 707/100 |
| 6,226,618 B1 | * | 5/2001 | Downs et al. | 705/1 |
| 6,493,679 B1 | * | 12/2002 | Rappaport et al. | 705/29 |
| 6,584,370 B1 | * | 6/2003 | Denton et al. | 700/107 |
| 6,625,616 B1 | * | 9/2003 | Dragon et al. | 707/104.1 |
| 6,650,954 B1 | * | 11/2003 | Zulpa et al. | 700/107 |
| 6,819,967 B1 | * | 11/2004 | Ballas et al. | 700/107 |
| 6,901,304 B1 | * | 5/2005 | Swan et al. | 700/115 |

* cited by examiner

*Primary Examiner*—Andrew Joseph Rudy
(74) *Attorney, Agent, or Firm*—Brian E. Harris; James E. Walton

(57) ABSTRACT

A bill of materials (BOM) sourcing system includes one or more data storage locations that store BOM sourcing criteria. The system also includes a sourcing engine that receives a BOM that includes a plurality of part identifiers. The sourcing engine identifies one or more part identifiers included in the BOM and searches supplier data to obtain pricing information associated with the identified parts. Furthermore, the sourcing engine receives sourcing criteria and determines which supplier should be used to supply each identified part based on the pricing information and the sourcing criteria. In addition, the system includes a transaction execution module that receives from the sourcing engine a part identifier for each identified part and the identity of the supplier to be used to supply each identified part. The transaction execution module generates one or more transaction documents based on this information and communicates the one or more transaction documents to the associated suppliers.

12 Claims, 1 Drawing Sheet

SOURCING OF BILLS OF MATERIALS

TECHNICAL FIELD OF THE INVENTION

This invention relates to the field of electronic commerce transactions, and more particularly to improved sourcing of bills of materials.

BACKGROUND OF THE INVENTION

Bills of materials (BOMs) are typically used to identify the various parts that are included in a particular product. Therefore, a BOM is a useful tool for conveying the information about what parts are needed to manufacture or otherwise create a product. BOMs are created by a BOM originator (such as an original equipment manufacturer) and then communicated in whole or in part to one or more suppliers (for example, as part of a request for quote). The suppliers then determine which parts are included in the product (or a portion of the product for which the supplier is responsible) and quote a price for each part or for a collection of parts to the BOM originator. Each supplier may also provide additional information, such as part availability and lead time, as appropriate. The BOM originator collects the various responses from the suppliers, analyzes the responses, determines which suppliers to use based on the responses, and communicates purchase orders or other transaction documents to the selected suppliers. This process may be referred to as "sourcing" a BOM.

One disadvantage with the process described above is that it inefficient for the BOM originator to have to collect and organize the various responses from the suppliers (which may be in a variety of formats) and to determine which suppliers to use based on a number of decision criteria. For example, in addition to pricing considerations, the BOM originator may have to review various contracts with suppliers to determine if the contracts have an effect on which suppliers are selected (for example, if the BOM originator has agreed to do a certain amount of business with a particular supplier). Furthermore, the process described above may take too long for certain circumstances since the BOM originator has to wait on the suppliers for responses and then has to analyze the responses before orders can be placed.

SUMMARY OF THE INVENTION

According to the present invention, disadvantages and problems associated with previous techniques for sourcing bills of materials have been substantially reduced or eliminated.

According to one embodiment of the present invention, a bill of materials (BOM) sourcing system includes one or more data storage locations that store BOM sourcing criteria. The system also includes a sourcing engine that receives a BOM that includes a plurality of part identifiers. The sourcing engine identifies one or more part identifiers included in the BOM and searches supplier data associated with one or more suppliers of parts to obtain pricing information associated with the identified parts. Furthermore, the sourcing engine receives sourcing criteria from one or more of the data storage locations and determines which supplier should be used to supply each identified part based on the pricing information and the sourcing criteria. In addition, the system includes a transaction execution module that receives from the sourcing engine a part identifier for each identified part and the identity of the supplier to be used to supply each identified part. The transaction execution module generates one or more transaction documents that identify one or more parts and include a request that a supplier provide the one or more parts and communicates the one or more transaction documents to the associated suppliers.

Particular embodiments of the present invention provide one or more technical advantages. For example, certain embodiments provide a bill of materials (BOM) sourcing system that can source one or more BOMs without having to communicate the BOMs to suppliers. This system has access to the supplier data so that pricing and other appropriate information may be discovered and the system includes the intelligence needed to select from the various suppliers based on the supplier data and appropriate selection crtieria. Therefore, BOMs may be sourced in a much quicker and more efficient manner than with previous BOM sourcing techniques.

Other technical advantages may be readily apparent to those skilled in the art from the figures, description and claims included herein.

BRIEF DESCRIPTION OF THE DRAWINGS

To provide a more complete understanding of the present invention and the features and advantages thereof, reference is made to the following description taken in conjunction with the accompanying drawings, in which.

DESCRIPTION OF EXAMPLE EMBODIMENTS

Figure 1:
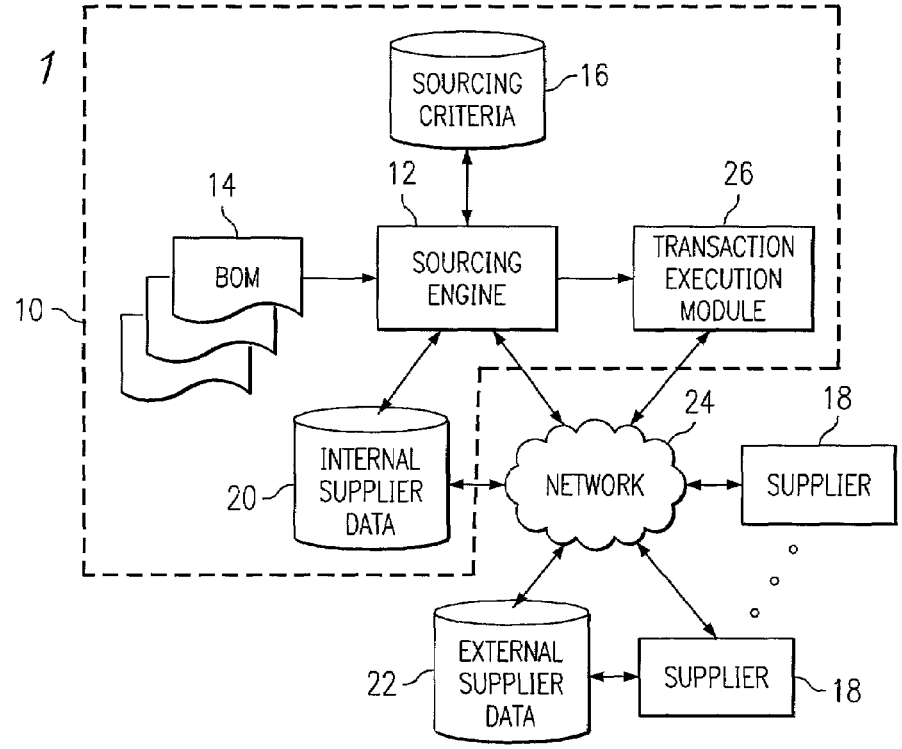
FIG. 1 illustrates an example bill of materials sourcing system.

FIG. 1 illustrates an example bill of materials (BOM) sourcing system 10. A BOM is a document or other data file that often includes a list of parts (or components) and sub-parts that are included in one or more products. For example, a BOM for a bicycle might include a list of parts such as a frame, wheels, handle bars, pedals, sprocket, and chain. Some of these parts may also have one or more associated sub-parts included in the BOM. For example, a wheel part or "assembly" may include a tire sub-part and a rim sub-part. Each part and/or sub-part in the BOM may have an associated part number, name, description and/or other appropriate part identifier and a required quantity of each part. Therefore, the BOM may be used to identify every part needed to make a product and the quantity of each part that is needed. Although an example BOM is described, the term "bill of materials" (or "BOM") is meant to include any list or other compilation of part or part information (including, but not limited to part numbers, part names, part descriptions, and manufacturer names) and is not limited to any particular formats of such information.

Since BOMs may be used to identify all the parts of a product, a BOM is a useful method of conveying the information about what parts are needed to manufacture or otherwise create a product. As an example only, an original equipment manufacturer (OEM) may generate a BOM that identifies a number of parts that are included in a particular product sold by the OEM. The product or portions of the product may be made for the OEM by one or more suppliers. In the past, the OEM would typically communicate the BOM to the suppliers that are to provide the parts and/or manufacture the product or portions of the product. For example, the BOM may be included as part of a request for quote (RFQ) associated with the product. The suppliers have then used the BOM to provide a quote to the OEM regarding the cost of providing one or more parts, or producing the product or the relevant portions of the product. This process may be referred to as "sourcing" a BOM.

In the sourcing process, the suppliers take the part number or other associated information from the BOM and use these part numbers to identify the parts needed and to determining pricing and other relevant information (such as available supply) for these parts. The OEM or other originator of the BOM then receives the pricing and other relevant information from the suppliers and determines how to fill the parts requirements (in other words, how to "source" the BOM). The BOM originator may consider a number of different factors besides price in determining how to source the BOM. As examples only, the BOM originator may have specific approved suppliers from which it may source BOMs and/or the BOM originator may have limitations on the number of suppliers that may be used to source a BOM. Once the BOM originator has determined how to source the BOM, the BOM originator may then communicate purchase orders or other appropriate documents to the suppliers.

System 10 provides an improved technique for sourcing BOMs. The components of system 10 allow BOMs to be sourced by system 10 without having to communicate the BOMs to suppliers. Furthermore, system 10 can enforce appropriate rules when sourcing the BOMs. The components of system 10 may be implemented as software and/or hardware associated with one or more computers in one or more locations. For example, system 10 may be associated with an OEM or other BOM originator or may be implemented at an electronic marketplace or other networked electronic trading site. System 10 includes a sourcing engine 12 that receives one or more BOMs 14, analyzes BOMs 14, and sources BOMs 14 according to sourcing information, restrictions, and rules (collectively referred to as "sourcing criteria" 16) stored in one or more data storage locations. Sourcing criteria 16 may include information identifying approved suppliers 18, information regarding contractual requirements or limitations from contracts with suppliers 18 that may affect the sourcing of BOMs 14, various other sourcing rules, and any other appropriate criteria for use in sourcing BOMs 14.

Any appropriate sourcing rules may be used. As examples only, these rules may include a rule specifying that a BOM 14 should be sourced at the lowest cost, a rule specifying that the BOM originator should only buy a certain amount of parts or products from a particular supplier 18, and/or a rule specifying that the number of suppliers 18 used to supply parts in a BOM 14 should be minimized. Each such rule may be enforced with respect to the other rules. For example some or all of the rules may be hard rules or constraints that may not be violated. Alternatively or in addition, some or all of the rules may be soft rules that may be violated. Such violations may incur penalties (possibly relative to the degree the rule is violated) that encourage the soft rules to be enforced, but that allow them be violated if such a violation produces a sourcing that is optimal or preferred.

As described above, one factor that may (and typically is) considered in sourcing a BOM 14 is the cost associated with sourcing the BOM 14 or portions of the BOM 14 from one or more suppliers 18. For example, as described above, sourcing engine 12 may implement a sourcing rule that attempts to minimize the cost of acquiring the parts or products in a BOM 14. To allow such cost and pricing determinations to be made, sourcing engine 12 may have access to one or more sources supplier data (such as pricing and available quantity information). This supplier data may include internal supplier data 20 stored in one or more data storage locations associated with system 10 and/or external supplier data 22 stored in one or more data storage locations external to system 10. Suppliers 18 may communicate internal supplier data 20 to system 10 on a periodic basis, as needed or requested by system 10, and/or in any other appropriate manner. Internal supplier data 20 may be communicated to system 10 using a communication network 24. In an example embodiment, network 24 includes the Internet and any appropriate local area networks (LANs), metropolitan area networks (MANs), or wide area networks (WANs) coupling system 10 to suppliers 18. External supplier data 22 may be maintained by suppliers 18 at one or more locations external to system 20 and made available to users using network 24 or any in other appropriate manner. System 10 may access external supplier data 22 as needed or desired to make sourcing determinations.

In operation, sourcing engine 12 receives one or more BOMs 14 from an appropriate source. For example, sourcing engine 12 may receive BOMs 14 from a local or remote BOM generation tool or from another appropriate component associated with a BOM originator. Sourcing engine 12 may then extract the part number or other identifier of each part from BOM 14 and use these part numbers or other identifiers to formulate one or more search queries of internal supplier data 20 and/or external supplier data 20. Through such search queries or other appropriate techniques of identifying appropriate supplier data, sourcing engine 12 may determine pricing and availability information associated with one or more suppliers 18 of each part listed in BOM 14. Sourcing engine 12 may then use this price and availability information in conjunction with sourcing criteria 16 to determine which supplier 18 should be used to obtain which parts or products included in BOM 14.

System 10 also may include a transaction execution module 26 that can implement the sourcing decisions made by sourcing engine 12. Transaction execution module 26 may communicate purchase orders or other similar transaction documents to suppliers 18 using network 24 or other appropriate communication techniques. For example, the transaction documents may be communicated using electronic data interchange techniques, electronic mail, web-based communications (such as hypertext mark-up language or extensible mark-up language), or faxes. These transaction documents reflect the sourcing determinations made by sourcing engine 12. For example, transaction execution module 26 may communicate a purchase order to each supplier 18 that sourcing engine 12 determined was to be used to provide one or more parts from a BOM 14. For instance, the purchase order may indicate the part number and description, the quantity needed, and the price that was quoted from the internal or external source of supplier data.

Figure 2:
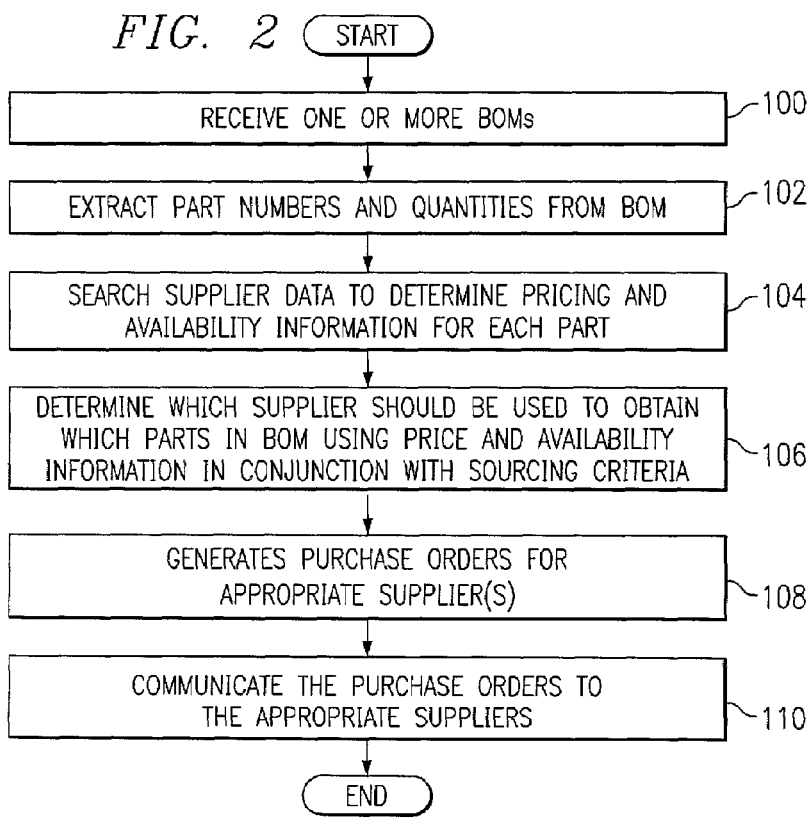
FIG. 2 illustrates an example method of sourcing a bill of materials.

FIG. 2 illustrates an example method of sourcing a BOM 14 using system 10. The method begins at step 100 where sourcing engine 12 receives one or more BOMs 14 from an appropriate source. At step 102, sourcing engine 12 extracts the part number or other identifier for each part in BOM 14 and uses these part numbers at step 104 to search internal supplier data 20 and/or external supplier data and determine pricing and availability information for one or more suppliers 18 for each part listed in BOM 14. At step 106, sourcing engine 12 uses this price and availability information in conjunction with sourcing criteria 16 to determine which supplier 18 should be used to obtain which parts or products included in BOM 14. If appropriate, these determinations may be communicated to one or more sources for approval (for example, sourcing engine 12 may communicate selected determinations based on appropriate criteria, such as the size or amount of a contemplated purchase). Alternatively, the determinations may be communicated directly to transaction execution module 26. Transaction execution module 26 receives these determinations (either with or without approval) and generates purchase orders or other similar transaction documents at step 108 for the supplier(s) 18 that were determined to be used as a source for the parts. At step 110, transaction execution module 26 uses network 24 or other appropriate communication resources to communicate the purchase orders to the appropriate suppliers 18, and the method ends. In such a manner, one or more BOMs 14 may be sourced by system without having to communicate the BOMs to suppliers (such as in an RFQ process). Therefore, BOMs 14 may be sourced in a much quicker and more efficient manner than with previous BOM sourcing techniques.

Although the present invention has been described with several embodiments, numerous changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A bill of materials (BOM) sourcing system, comprising:
one or more data storage locations operable to store BOM sourcing criteria;
a sourcing engine operable to:
receive a BOM including a plurality of part identifiers;
identify one or more part identifiers included in the BOM;
search supplier data associated with one or more suppliers of parts to obtain pricing information associated with the identified parts;
receive the sourcing criteria from the one or more data storage locations; and
determine which supplier should be used to supply each identified part based on the pricing information and the sourcing criteria; and
a transaction execution module operable to:
receive from the sourcing engine a part identifier for each identified part and the identity of the supplier to be used to supply each identified part;
generate one or more transaction documents each identifying one or more parts and including a request that a supplier provide the one or more parts; and
communicate the one or more transaction documents to the associated suppliers.

2. The system of claim 1, wherein the sourcing engine is further operable to:
identify in the BOM a required quantity of each identified part;
search the supplier data for availability information associated with the identified parts; and
use the availability information and required quantity when determining which supplier should be used to supply each identified part.

3. The system of claim 1, wherein one or more of the data storage locations are operable to store supplier data locally at the bill of materials sourcing system, the one or more storage locations coupled to a communication network and operable to receive updated supplier data using the network.

4. The system of claim 1, wherein the supplier data is stored in one or more data storage locations external to the bill of materials sourcing system, the sourcing engine operable to access the supplier data using a communication network.

5. The system of claim 1, wherein the sourcing criteria comprise information identifying approved suppliers of one or more parts, the suppliers used to supply each identified part being limited to the approved suppliers.

6. The system of claim 1, wherein the sourcing criteria comprise contractual requirements with one or more suppliers that affect the sourcing of the BOM.

7. The system of claim 1, wherein the sourcing criteria comprise a rule specifying that the BOM should be sourced at the lowest cost.

8. The system of claim 1, wherein the sourcing criteria comprise a rule limiting the amount of parts obtained from a particular supplier.

9. The system of claim 1, wherein the sourcing criteria comprise a rule specifying that the total number of suppliers used to supply the identified parts should be minimized.

10. The system of claim 1, wherein the transaction documents further identify the pricing information obtained from the supplier data for each part.

11. The system of claim 1, wherein the transaction execution module is operable to communicate the one or more transaction documents using a communication technique selected from the group consisting of electronic mail, fax, web-based communications, and electronic data interchange (EDI).

12. A bill of materials (BOM) sourcing system, comprising:
means for receiving a BOM, the BOM including a plurality of part identifiers;
means for identifying one or more part identifiers included in the BOM;
means for searching supplier data associated with one or more suppliers of parts to obtain pricing information associated with the identified parts;
means for receiving sourcing criteria;
means for determining which supplier should be used to supply each identified part based on the pricing information and the sourcing criteria;
means for generating one or more transaction documents each identifying one or more parts and including a request that the determined supplier provide the one or more parts; and
means for communicating the one or more transaction documents to the associated suppliers.

* * * * *